(12) United States Patent
Köhler et al.

(10) Patent No.: US 6,228,524 B1
(45) Date of Patent: *May 8, 2001

(54) STORAGE BATTERY WITH TEMPERTURE-CONTROL DEVICE

(75) Inventors: Uwe Köhler, Kelkheim; Ulrich Jahn, Hemhofen, both of (DE)

(73) Assignee: Varta Aktiengesellschaft, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,794

(22) Filed: Nov. 9, 1998

(30) Foreign Application Priority Data

Nov. 12, 1997 (DE) .............................. 197 50 069

(51) Int. Cl.⁷ .................................................. H01M 10/50
(52) U.S. Cl. ........................... 429/62; 429/148; 429/153; 429/71; 429/99
(58) Field of Search ................................. 429/62, 61, 163, 429/164, 149, 153, 154, 71, 96, 99, 148

(56) References Cited

U.S. PATENT DOCUMENTS

| | | | |
|---|---|---|---|
| 3,953,227 | * | 4/1976 | Jones et al. .................. 136/6 FS |
| 4,383,013 | * | 5/1983 | Bindin et al. .................. 429/112 |
| 5,228,923 | * | 7/1993 | Hed .................................. 136/208 |
| 5,879,833 | * | 3/1999 | Yoshii et al. ..................... 429/62 |

FOREIGN PATENT DOCUMENTS

| | | |
|---|---|---|
| 92 10 384 U | 11/1992 | (DE) . |
| 43 26 943 A1 | 2/1995 | (DE) . |

* cited by examiner

Primary Examiner—Stephen Kalafut
Assistant Examiner—R Alejandro
(74) Attorney, Agent, or Firm—Schnader Harrison Segal & Lewis LLP

(57) ABSTRACT

The invention relates to a storage battery with several cylindrical cells, the cell walls of which are in close heat-conducting contact with a temperature-control device. The temperature-control device has at least two hollow bodies (2) through which a temperature-control medium flows, which bodies display semicircular bulges (6), the radii of which correspond approximately to that of the cells (1), and which are arranged in such a way that they fix the spatial positions of the cells (1) to each other.

20 Claims, 2 Drawing Sheets

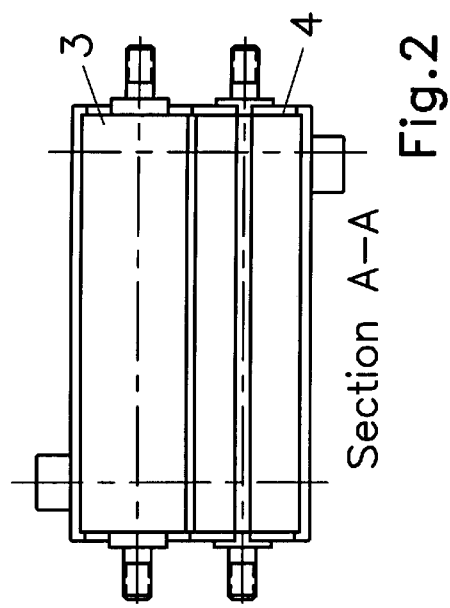
Fig.2 Section A-A
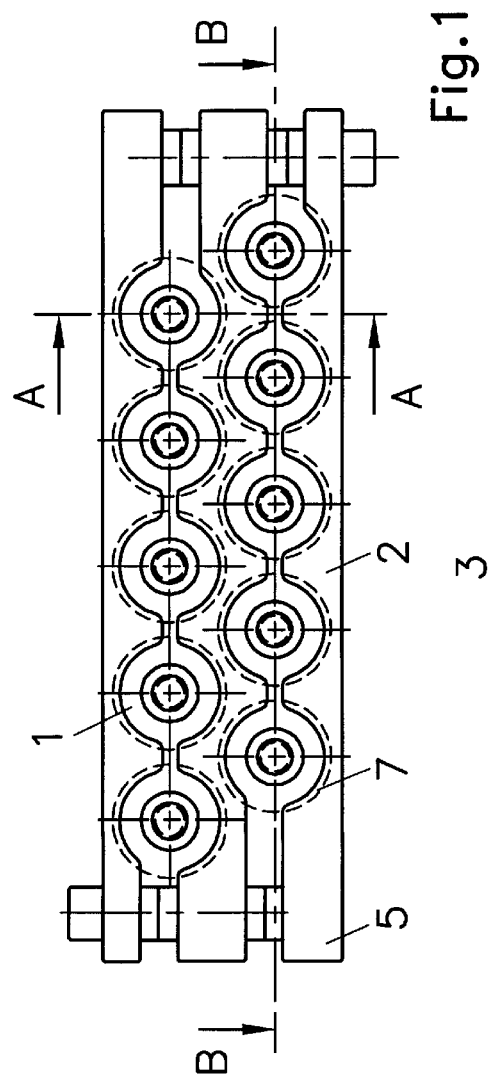
Fig.1
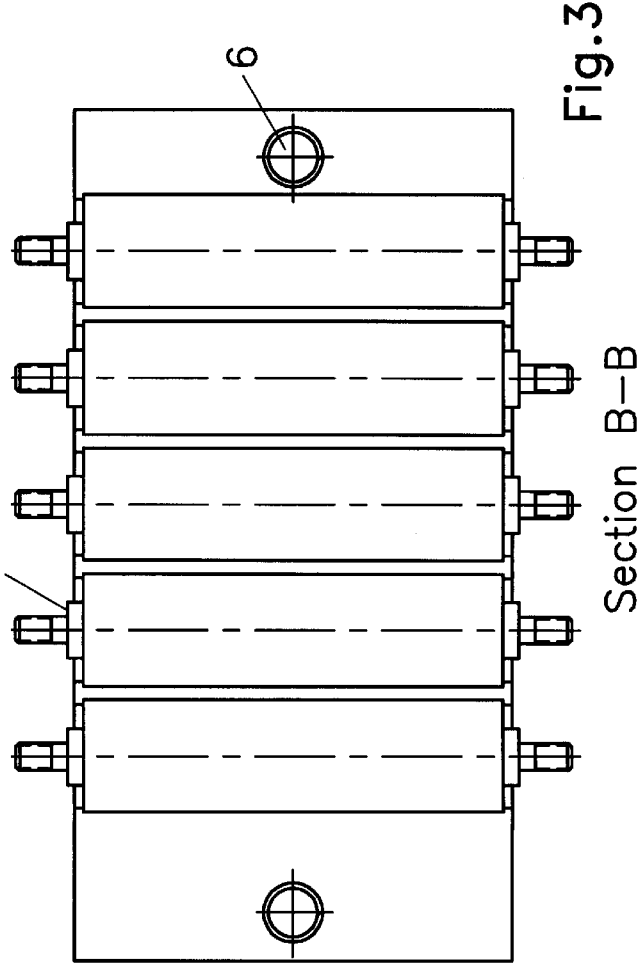
Fig.3 Section B-B

STORAGE BATTERY WITH TEMPERTURE-CONTROL DEVICE

BACKGROUND OF THE INVENTION

1. Field of the Invention

The invention relates to a storage battery with several cylindrical cells, the cell walls of which are in close heat-conducting contact with a temperature-control device.

2. Description of the Related Art

Highly loaded battery systems represent an important key component for future hybrid vehicles. High requirements imposed on their power at a relatively low energy content are a characteristic feature of these hybrid vehicle batteries. Typical energy contents in such cases lie in the range from 3 to 10 kWh. The required power during charging and discharging for a typical vehicle in such cases may range up to 100 kW. In addition to pure electrical operation for short distances, mixed operation is also envisioned for hybrid vehicles in which the battery is used as the energy source for improved acceleration. Rapid recharging and high discharge powers are especially necessary during this mode of operation.

The high charging and discharging powers naturally involve high internal losses which accumulate as heat in the battery. The heat losses accumulating in the battery arise in the interior of the cells in the parts through which the charging and discharging current flows. The heat can only be carried off through the surface by radiation, convection, and heat conduction (e.g., through the bottom or the casing surface). In the case of large storage batteries, the ratio of surface to volume is so unfavorable that the heat generated in normal charging and discharging operations can be dissipated only at operating temperatures exceeding values that are detrimental to the service life of the energy storage unit.

The result is a limitation of usefulness due to the necessary cooling pauses, or a reduced service life. In large storage batteries with 50 to 300 cells, a temperature gradient of 5 to 10 Kelvin may arise between the center and the edge of the battery. Because of the different cell temperatures then, the fully charged state is achieved at different times due to the temperature dependence of the charge absorption and other processes such as hydrogen evolution and oxygen recombination in water-based battery systems. In the case of a limited charging time, this leads to discrepancies between the charge states of the individual cells and ultimately to their failure after the overloading of cells with low charge states. This is also true of storage batteries for purely electrically driven road vehicles.

Because of the voltage position favored by automobile manufacturers of 300 to 400 volts, a storage battery based on a nickel-hydride system must consist of about 300 individual cells. Depending on the required energy contents of the storage battery, therefore, cells with a capacity between 7 and 25 Ah are required. Cells with such a capacity are preferably manufactured as cylindrical cells because the manufacturing cost for the production of such cells is relatively low. A storage battery is described in German patent no. DE-A 4326943. In this case, the cells are arranged in a rectangular box in such a way that the end faces of the cells are exposed. A stream of air is provided as cooling which utilizes the channels formed by the wedge-shaped hollow spaces between the cells. Primarily because of the previously described internal cells losses, such a storage battery in a typical high-load operation experiences rapid heating which is difficult to counteract by ordinary air cooling. One of the reasons for this is the very low heat capacity of air at 1.01 kJ/kg*K. A typical cyclic operation, e.g., of a storage battery consisting of 300 cells each with a capacity of 10 Ah, looks as follows:

| Charge 1: | 100 A (5 sec) | Charge power: | about 44 kW | Charge energy: | 61 Wh |
|---|---|---|---|---|---|
| Charge 2: | 30 A (15.5 sec) | Charge power: | about 13 kW | Charge energy: | 56 Wh |
| Discharge: | 120 A (8 sec) | Discharge power: | about 42 kW | Discharge energy: | 93 Wh |
| Pause: | 31.5 sec | Loss power: | about 1600 W | | |

The energy difference of about 22% between charging and discharging is caused by the different voltage levels. These are a consequence of ohmic losses during cell operation and the hysteresis in the case of a single potential characteristic of the positive nickel-hydroxide electrode.

FIG. 4 shows that a battery cooled with air of 20° C. in the case of 80 minutes of operating time is heated up to values above 60° C., in which case, depending on the cell size and the arrangement of the individual cells (close air inlet or outlet), large temperature differences occur between the individual cells.

Liquid cooling of the cells is known for storage batteries constructed from prismatic cells. Thus, for example, in German utility patent G 92 10 384, plate-shaped liquid-permeated cooling bodies are disclosed which, in each case, are arranged between the large side faces of neighboring cells. The storage battery, consisting of the individual cells and the cooling bodies positioned between them, is held together by a battery trough. Such cells represent the preferred type for traction batteries. Plate-shaped cooling bodies are problematic for cylindrical cells because of the wedge-shaped volume remaining in that case. The advantages of pressure-stable and easily manufactured cylindrical cells are opposed by the disadvantages that the wedge-shaped volume between the cylindrical cells cannot be utilized electrochemically, and the volume and with it the weight of the temperature-regulating fluid used increases so that the gravimetric energy density of the storage battery is reduced.

SUMMARY OF THE INVENTION

The invention is directed to a storage battery comprising several cylindrical cells with a temperature-control device permitting the arrangement in a compact positionally fixed manner of a large number of cylindrical cells and effectively controlling their temperature while omitting a battery trough.

In one embodiment, the storage battery comprises several cylindrical cells arranged in at least one row, which cells are fixed in their spatial positions to one another by a temperature-control device comprising at least two hollow bodies through which a coolant flows, said hollow bodies displaying on their large sides semicircular bulges, the radii of which correspond approximately to those of the cells. An additional battery trough or container can be omitted with the storage battery according to the invention. The coolant flowing through the hollow bodies is held at temperatures between +10° C. and +45° C. so that the cells operate in the temperature range that is favorable for their operation. The storage battery according to the invention may also be heated with the aid of a temperature-control device when required.

According to one embodiment, the present invention is a storage battery having a plurality of cylindrical cells arranged in one or more cell rows, the cell walls of which are in close heat-conducting contact with a temperature-control device comprising at least two hollow bodies through which a temperature-control medium flows, wherein the bodies have semicircular bulges, the radii of which correspond approximately to those of the cells, and which are arranged in such a way that they fix the cells in their spatial positions to each other. In possible implementations: each cell row is enclosed by two of the hollow bodies, with a last cell row being closed off by one of the hollow bodies having bulges only on a side facing toward the cells;

the cell rows are arranged with gaps with respect to each other;

the hollow bodies have an edge region extending out past the cell rows in which inflow and outflow fittings for the temperature-control medium are situated;

the inflow and outflow fittings lie opposite the individual hollow bodies;

the hollow bodies have an edge overlapping end faces of the cells;

the hollow bodies are produced from plastic by a blow-molding process; and/or a water-glycol mixture is used as the temperature-control medium.

BRIEF DESCRIPTION OF THE DRAWINGS

Other aspects, features, and advantages of the present invention will become more fully apparent from the following detailed description, the appended claims, and the accompanying drawings in which:

FIG. 1 shows a top view of a storage battery according to the invention;

FIG. 2 shows a sectional representation along line A—A;

FIG. 3 shows a sectional representation along line B—B;

DETAILED DESCRIPTION

Figure 4:
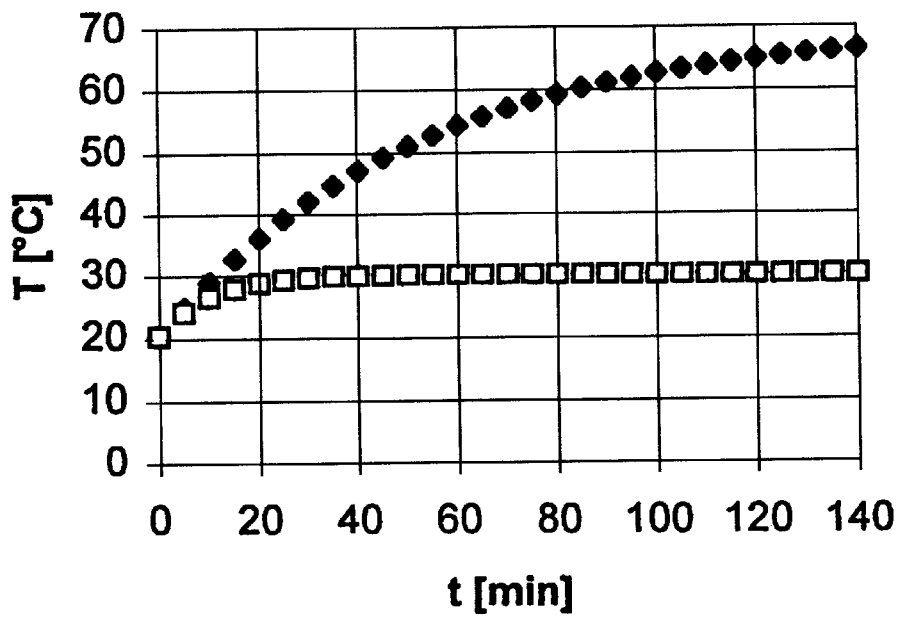
FIG. 4 shows the temperature curve of an air-cooled high power battery.

According to FIGS. 1 to 3, the cells 1 of the storage battery are arranged in rows in such a way that the cells 1 stand in gaps relative to the cells of the next row. One row of cells 1 in this case is always fixed by two hollow bodies 2 through which a temperature-control medium flows. The edge 4 of the hollow bodies 2 which overlaps over the end sides 3 of the cells 1 prevents a change in position of the cells 1 in their longitudinal direction. The hollow bodies 2 have an edge region 5 extending the cell rows on which the inflow and outflow fittings 6 are arranged in such a way that they lie opposite the inflow and outflow fittings 6 of the hollow body 2 enclosing the next row. The hollow bodies 2 enclosing the last rows of cells 1 possess bulges 7 only on the large side facing toward the cells 1. Advantageously, the contact areas or surfaces between the cylindrical cell surface and the surface of the semicircular bulges 7 receiving them is provided with a heat-conducting medium which additionally contributes to improving the heat transfer.

The hollow bodies 2 described above are advantageously produced as blow-molded plastic bodies. In this way, on the one hand, cost-effective production is attained and, on the other hand, the hollow body 2 simultaneously serves as electrical insulation of the cells 1 from each other. The cells 1 generally have a steel casing which is connected to the negative pole of the cells. The hollow bodies 2 may also be manufactured of metal if electrical insulation is provided between the cell surface and the hollow body 2. In the case of a metal cell housing, this can be achieved by applying a thin electrically insulating layer of enamel, which has scarcely any effect on heat transfer. The hollow metal bodies 2 are preferably made from aluminum because of the low weight. The surface film, which is important for purposes of electrical insulation, is then advantageously produced by anodic oxidation. Even at relatively low layer thicknesses, good insulating effects are achieved in this manner which have scarcely any effect on heat conductivity. As an alternative, the cells I can also be provided with a plastic housing so that an electrically insulating layer on the hollow metal bodies 2 can be omitted.

FIG. 4 shows the temperature curve in an air-cooled storage battery which is operated in the above described charging and discharging mode. The cooling is achieved with 150 m$^3$/h of air at 20° C., while the temperature of the warmest cell (♦) opposite the coldest cell (□) rises within 120 minutes by about 40° C. and reaches absolute values of about 70° C.

Figure 5:
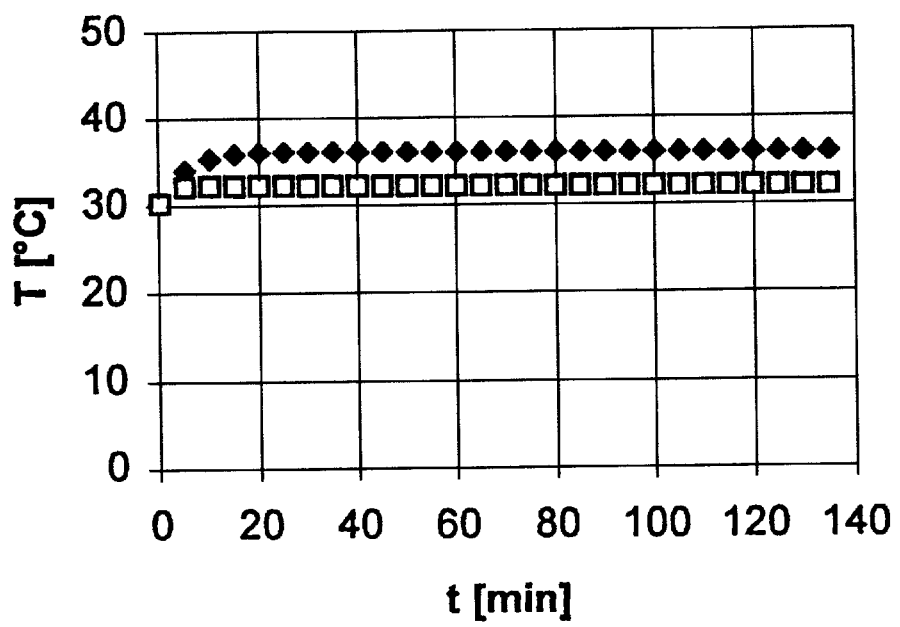
FIG. 5 shows the temperature curve in a storage battery according to the invention.

FIG. 5 shows the temperature curve in a storage battery according to the invention, which is operated according to the above-described charging and discharging mode. The circulating temperature-control liquid in this case is held at a temperature level of about 30° C. by an external heat exchanger. At a circulation rate of 100 l of water/h, the average temperature level of the battery increases only about 36° C., while the maximum temperature difference in the battery between the warmest cells (♦) and the coolest cell (□) does not exceed essentially a value of 5 K. A glycol/water mixture is preferably used for temperature control of the cells of the storage battery.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A storage battery having a plurality of cylindrical cells arranged in one or more cell rows, the cell walls of which are in heat-conducting contact with a temperature-control device comprising at least two hollow bodies through which a temperature-control medium flows, wherein each of said bodies defines a plurality of semicircular bulges with radii of a length that are approximately the same as radii of corresponding cells, and opposed bulges fix the cells in selected positions relative to each other, and wherein opposed semicircular bulges make heat-conducting contact with a corresponding cell along substantially its entire circumferential surface.

2. The storage battery of claim 1, wherein each cell row is enclosed by two of the hollow bodies, with a last cell row being closed off by one of the hollow bodies having bulges only on a side facing toward the cells.

3. The storage battery of claim 2, wherein the cell rows are arranged with gaps with respect to each other.

4. The storage battery of claim 2, wherein the hollow bodies have an edge region extending out past the cell rows in which inflow and outflow fittings for the temperature-control medium are situated.

5. The storage battery of claim 2, wherein:

the hollow bodies are produced from plastic by a blow-molding process; and a water-glycol mixture is used as the temperature-control medium.

6. The storage battery of claim 1, wherein the cell rows are arranged with gaps with respect to each other.

7. The storage battery of claim 6, wherein the hollow bodies have an edge region extending out past the cell rows in which inflow and outflow fittings for the temperature-control medium are situated.

8. The storage battery of claim 6, wherein the hollow bodies have an edge overlapping end faces of the cells.

9. The storage battery of claim 6, wherein:
the hollow bodies are produced from plastic by a blow-molding process; and
a water-glycol mixture is used as the temperature-control medium.

10. The storage battery of claim 1, wherein the hollow bodies have an edge region extending out past the cell rows in which inflow and outflow fittings for the temperature-control medium are situated.

11. The storage battery of claim 10, wherein the inflow and outflow fittings lie opposite the individual hollow bodies.

12. The storage battery of claim 10, wherein the hollow bodies have an edge overlapping end faces of the cells.

13. The storage battery of claim 10, wherein:
the hollow bodies are produced from plastic by a blow-molding process; and
a water-glycol mixture is used as the temperature-control medium.

14. The storage battery of claim 1, wherein the hollow bodies have an edge overlapping end faces of the cells.

15. The storage battery of claim 14, wherein:
the hollow bodies are produced from plastic by a blow-molding process; and
a water-glycol mixture is used as the temperature-control medium.

16. The storage battery of claim 1, wherein the hollow bodies are produced from plastic by a blow-molding process.

17. The storage battery of claim 16, wherein a water-glycol mixture is used as the temperature-control medium.

18. The storage battery of claim 1, wherein a water-glycol mixture is used as the temperature-control medium.

19. The storage battery of claim 1, wherein:
each cell row is enclosed by two of the hollow bodies, with a last cell row being closed off by one of the hollow bodies having bulges only on a side facing toward the cells;
the cell rows are arranged with gaps with respect to each other;
the hollow bodies have an edge region extending out past the cell rows in which inflow and outflow fittings for the temperature-control medium are situated;
the inflow and outflow fittings lie opposite the individual hollow bodies;
the hollow bodies have an edge overlapping end faces of the cells;
the hollow bodies are produced from plastic by a blow-molding process; and
a water-glycol mixture is used as the temperature-control medium.

20. A storage battery comprising:
a plurality of cylindrical cells arranged in one or more cell rows, each cell having a selected cell radius; and
at least two hollow bodies through which a temperature-control medium flows, the hollow bodies each defining semicircular bulges therein to fix the cells in selected positions therebetween, wherein the semicircular bulges have a bulge radius selected to approximately correspond to the selected cell radii such that the semicircular bulges substantially surround the cells and wherein opposed semi-circular bulges make heat-conducting contact with a corresponding cell along substantially its entire circumferential surface.

* * * * *